(12) United States Patent
Dattalo

(10) Patent No.: US 12,436,644 B2
(45) Date of Patent: Oct. 7, 2025

(54) CAPACITIVE SENSOR DRIVING SCHEME FOR MINIMIZING PEAK-TO-AVERAGE-POWER RATIO

(71) Applicant: Synaptics Incorporated, San Jose, CA (US)

(72) Inventor: Tracy Scott Dattalo, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/597,034

(22) Filed: Mar. 6, 2024

(65) Prior Publication Data

US 2025/0284364 A1    Sep. 11, 2025

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ....... G06F 3/041; G06F 3/0416–04166; G06F 3/0418–04184; G06F 3/044; G06F 3/0446
See application file for complete search history.

(56) References Cited

U.S. PATENT DOCUMENTS

| | | | | |
|---|---|---|---|---|
| 2017/0285795 A1* | 10/2017 | Tanemura | ............ | G06F 3/0446 |
| 2017/0329456 A1* | 11/2017 | Leigh | ................... | G06F 3/0446 |
| 2019/0050075 A1* | 2/2019 | Reynolds | .............. | G06F 3/0446 |
| 2020/0233531 A1* | 7/2020 | Weinerth | .............. | G06F 3/0442 |
| 2021/0397297 A1* | 12/2021 | Ding | ..................... | G06F 3/0443 |
| 2022/0382451 A1* | 12/2022 | Bihday | ................ | G06F 3/0446 |
| 2024/0302915 A1* | 9/2024 | Darthenay | .......... | G06F 3/04166 |
| 2024/0302918 A1* | 9/2024 | Goussin | ................ | G06F 3/0446 |

* cited by examiner

*Primary Examiner* — Keith L Crawley
(74) *Attorney, Agent, or Firm* — Leydig, Voit & Mayer, Ltd.

(57) ABSTRACT

A system includes a plurality of sensor electrodes and a processing system. The processing system is configured to: drive sensor electrodes of the plurality of sensor electrodes with sensing signals corresponding to a plurality of frequencies; adjust, while driving the sensor electrodes of the plurality of sensor electrodes with the sensing signals, instantaneous phase(s) of one or more of the sensing signals; and obtain, via at least one sensor electrode of the plurality of sensor electrodes, resulting signals corresponding to the sensing signals, wherein the resulting signals are indicative of one or more of presence, position, motion, or features of one or more input objects.

17 Claims, 9 Drawing Sheets

CAPACITIVE SENSOR DRIVING SCHEME FOR MINIMIZING PEAK-TO-AVERAGE-POWER RATIO

TECHNICAL FIELD

The described embodiments relate generally to electronic devices, and more specifically, to capacitive sensors.

BACKGROUND

Input devices, including capacitive sensor devices (e.g., touchpads or touch sensor devices), are widely used in a variety of electronic systems. A capacitive sensor device may include a sensing region, often demarked by a surface, in which the capacitive sensor device determines presence, position, motion, and/or features corresponding to one or more input objects. Capacitive sensor devices may be used to provide interfaces for the electronic system. For example, capacitive sensor devices may be used as input devices for larger computing systems (e.g., opaque touchpads integrated in, or peripheral to, notebook or desktop computers). Capacitive sensor devices are also often used in smaller computing systems (e.g., touchscreens integrated in cellular phones). Capacitive sensor devices may also be used to detect input objects (e.g., finger, styli, pens, fingerprints, etc.).

For touchscreen devices which include capacitive sensors integrated with displays, touch-to-display noise is often a concern, as sensing signals used for driving a capacitive sensor may interfere with display signals used to provide a displayed output.

SUMMARY

In an example embodiment, the present disclosure provides a system. The system includes a plurality of sensor electrodes and a processing system. The processing system is configured to: drive sensor electrodes of the plurality of sensor electrodes with sensing signals corresponding to a plurality of frequencies; adjust, while driving the sensor electrodes of the plurality of sensor electrodes with the sensing signals, instantaneous phase(s) of one or more of the sensing signals; and obtain, via at least one sensor electrode of the plurality of sensor electrodes, resulting signals corresponding to the sensing signals, wherein the resulting signals are indicative of one or more of presence, position, motion, or features of one or more input objects.

In a further embodiment, the plurality of sensor electrodes comprise absolute capacitance sensor electrodes, and the resulting signals are obtained from the same sensor electrodes as are driven with the sensing signals.

In a further embodiment, the plurality of sensor electrodes comprise: transmitter electrodes corresponding to the sensor electrodes driven with sensing signals; and at least one receiver electrode corresponding to the at least one sensor electrode via which the resulting signals are obtained.

In a further embodiment, the processing system comprises a plurality of transmitter circuits, wherein each transmitter circuit is configured to generate a respective sensing signal corresponding to a respective waveform.

In a further embodiment, each respective waveform is a sinusoidally modulated sinewave.

In a further embodiment, the plurality of transmitter circuits generate a set of orthogonal frequency division multiplexing (OFDM) with phase modulation (PM) (OFDM-PM) signals.

In a further embodiment, the instantaneous phase adjustment is configured to constrain amplitude.

In a further embodiment, driving the sensor electrodes of the plurality of sensor electrodes with sensing signals corresponding to a plurality of frequencies includes driving at least two respective sensor electrodes with the same frequency and driving at least two respective sensor electrodes with different frequencies.

In a further embodiment, the instantaneous phase adjustment is constrained to limit a sum of all voltages of the sensing signals to be less than or equal to a peak voltage.

In a further embodiment, modulation indices for each of the sensing signals is less than respective frequency separation(s) between frequencies of the plurality of frequencies.

In another example embodiment, the present disclosure provides a processing system. The processing system includes: transmitter circuitry configured to: drive sensor electrodes of a plurality of sensor electrodes with sensing signals corresponding to a plurality of frequencies; and adjust, while driving the sensor electrodes of the plurality of sensor electrodes with the sensing signals, instantaneous phase(s) of one or more of the sensing signals; and receiver circuitry configured to: obtain, via at least one sensor electrode of the plurality of sensor electrodes, resulting signals corresponding to the sensing signals, wherein the resulting signals are indicative of one or more of presence, position, motion, or features of one or more input objects.

In a further embodiment, the transmitter circuitry comprises a plurality of transmitter circuits, wherein each transmitter circuit is configured to generate a respective sensing signal corresponding to a respective waveform.

In a further embodiment, driving the sensor electrodes of the plurality of sensor electrodes with sensing signals corresponding to a plurality of frequencies includes driving at least two respective sensor electrodes with the same frequency and driving at least two respective sensor electrodes with different frequencies.

In a further embodiment, the instantaneous phase adjustment is constrained to limit a sum of all voltages of the sensing signals to be less than or equal to a peak voltage.

In a further embodiment, modulation indices for each of the sensing signals is less than respective frequency separation(s) between frequencies of the plurality of frequencies.

In yet another example embodiment, the present disclosure provides a method. The method includes: driving sensor electrodes of a plurality of sensor electrodes with sensing signals corresponding to a plurality of frequencies; adjusting, while driving the sensor electrodes of the plurality of sensor electrodes with the sensing signals, instantaneous phase(s) of one or more of the sensing signals; and obtaining, via at least one sensor electrode of the plurality of sensor electrodes, resulting signals corresponding to the sensing signals, wherein the resulting signals are indicative of one or more of presence, position, motion, or features of one or more input objects.

In a further embodiment, respective sensing signals are generated by respective transmitter circuits configured to generate respective waveforms.

In a further embodiment, driving the sensor electrodes of the plurality of sensor electrodes with sensing signals corresponding to a plurality of frequencies includes driving at least two respective sensor electrodes with the same frequency and driving at least two respective sensor electrodes with different frequencies.

In a further embodiment, the instantaneous phase adjustment is constrained to limit a sum of all voltages of the sensing signals to be less than or equal to a peak voltage.

In a further embodiment, modulation indices for each of the sensing signals is less than respective frequency separation(s) between frequencies of the plurality of frequencies.

DETAILED DESCRIPTION

Figure 1A:
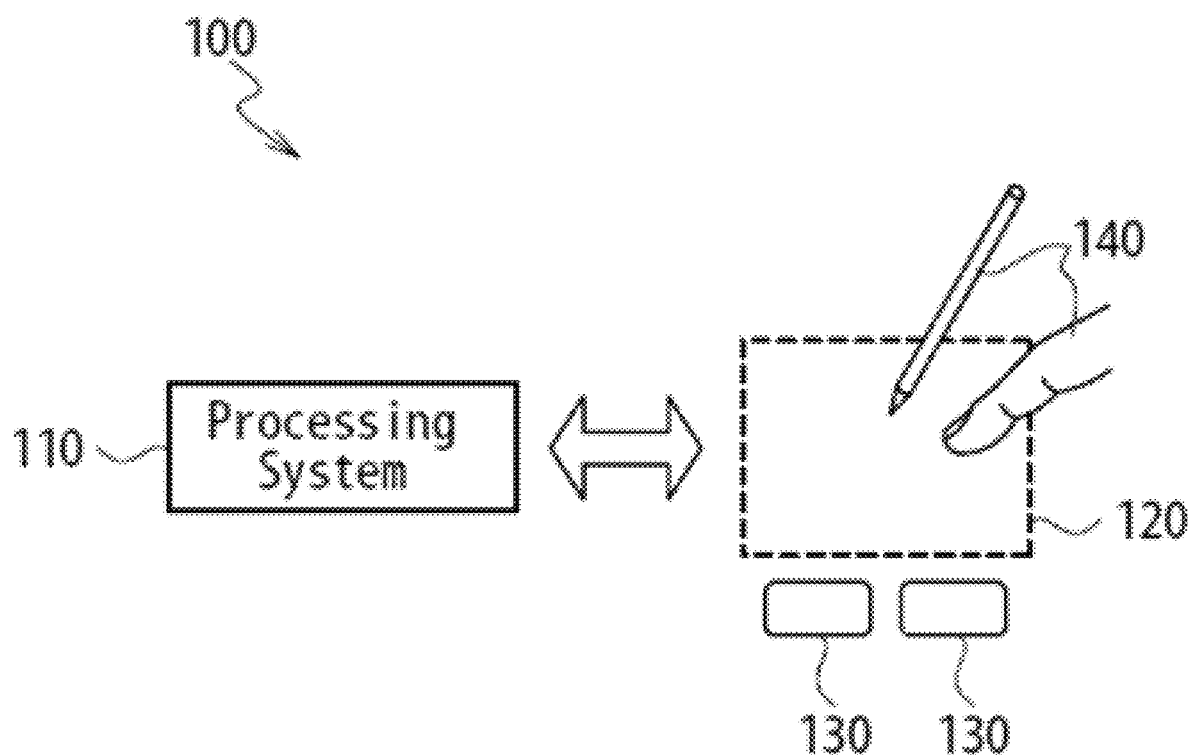
FIGS. 1A-1B are schematic/block diagrams depicting examples of an input device.

The drawings and the following detailed description are merely exemplary in nature, and are not intended to limit the disclosed technology or the application and uses of the disclosed technology. Furthermore, there is no intention to be bound by any expressed or implied theory presented in the preceding technical field, background, or the following detailed description.

In the following detailed description of exemplary embodiments, numerous details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following description of sensor patterns relies on terminology such as "horizontal", "vertical", "top", "bottom", and "under" to clearly describe certain geometric features of the sensor patterns. The use of these terms is not intended to introduce a limiting directionality. For example, the geometric features may be rotated to any degree, without departing from the disclosure. Further, while patterns of certain sizes are shown in the drawings, the patterns may extend and/or repeat without departing from the disclosure. For example, the use of the term columns and vertical direction is to distinguish between rows and the horizontal direction, respectively. If the input device is rectangular, any direction along the surface may be designated as the vertical direction by which a column extends and any substantially orthogonal direction along the surface may be designated as a vertical direction along which the row extends.

In some examples, mutual capacitance sensing of two-dimensional capacitive sensors involves stimulating sensor electrodes on one axis of a sensor array (transmitter electrodes) with sensing signals and measuring the response (resulting signals) obtained via sensor electrodes on the other axis (receiver electrodes). Similarly, in some examples, absolute capacitance sensing of two-dimensional capacitive sensors involves stimulating sensor electrodes of a sensor array and measuring the response (resulting signals) obtained via the same sensor electrodes. Signal detection improves as the power corresponding to the sensing signals used to drive the sensor electrodes is increased. However, if the power is too high, then the sensing signals may interfere with other parts of a system or may overload the receiver electrodes or receiver circuitry. For example, in a touch-screen device, the sensing signals may cause touch-to-display noise.

Exemplary embodiments of the present disclosure provide a phase modulation scheme that controls the instantaneous phase of an array of transmitter channels (corresponding to respective sensing signals driven onto respective sensor electrodes for capacitive sensing) such that at any instant in time the aggregation of all the transmitter channels results in an aggregate waveform that does not exceed a predetermined peak amount of power. Relative to a conventional system in which no provision is made to limit a peak amount of power, exemplary embodiments of the present invention are able to provide a comparable amount of per-channel average power while avoiding problems associated with peak power spikes causing interference or overloading. In other words, exemplary embodiments of the present disclosure provide a driving scheme for a capacitive sensor which minimizes peak-to-average-power ratio (PAPR).

The driving scheme according to exemplary embodiments of the present disclosure utilizes orthogonal frequency division multiplexing (OFDM) with phase modulation (OFDM-PM) to achieve various benefits associated with OFDM (e.g., narrower bandwidth, higher signal-to-noise ratio (SNR), maximum processing gain, and little or no motion artifacts) while avoiding drawbacks associated with conventional OFDM (i.e., a peak amplitude of an aggregate of transmitters in a conventional OFDM where each transmitter is driven with an amplitude A system cannot be made smaller than $A*sqrt(N)$ for an N-transmitter system). The driving scheme according to exemplary embodiments of the present disclosure is thereby able to reduce touch-to-display interference, and also reduce dynamic range requirements so as to allow for an analog front end (AFE) to be reduced in size. OFDM-PM is also known as sinusoidal phase modulation, wherein a carrier frequency that is phase modulated can be chosen in a way that is analogous to the way in which the frequencies of OFDM are chosen.

It will be appreciated that the principles discussed herein are not limited to sinusoidal modulation. The principles discussed herein are also applicable to any other period functions, including, for example, square waveforms, saw tooth waveforms, and triangle waveforms.

It will further be appreciated that, although the example given above relates to limiting touch-to-display noise, the principles discussed herein may also be applied in other contexts to mitigate other types of noise and interference. For example, in an exemplary embodiment, the driving scheme discussed herein for minimizing PAPR may also be applied to mitigate against display waveforms coupling into a touch sensor. The effects of adversarial interference in other situations may also be reduced.

It will further be appreciated that the principles discussed herein may be applied to the situation of multiple transmitters each broadcasting its own OFDM channel, as well as the situation of a single transmitter broadcasting on two or more OFDM channels simultaneously.

Combining carriers using the PAPR minimization techniques discussed herein allows for the energy of each carrier can be made as large as the energy of a single carrier in the non-frequency modulated OFDM scheme. Each transmitter-to-receiver coupling can be viewed as a channel with a certain capacity. By transmitting multiple carriers at once, the capacity consumption is maximized. Interference tends to be either broadband or tonal. The overall interference energy is physically limited. The broadband interference amplitude is small across all frequencies. Thus, it can be filtered by combining the measurements obtained from the combination of carriers for the single transmitter-to-receiver coupling. For tonal interference, the energy is concentrated in narrow bands. Presumably, the transmitter-to-receiver is capable of locating at least one channel not in these bands.

As an example, suppose a 2 ms measurement interval is used. The frequency of the OFDM carriers should then have an integer multiple of the reciprocal of the period: $f_i=i1/T$, or in this example the frequencies are 500 Hz apart. For a spectrum from 50 kHz to 150 kHz, then 201 carriers can fit. A typical capacitance sensor needs no more than 20 to 60 carriers. One approach is to choose the "best" 20 channels and sense over those. Another approach is to place a smaller number of carriers (e.g., 10 carriers) on each channel and then let the receiver choose which one is best.

Figure 1B:
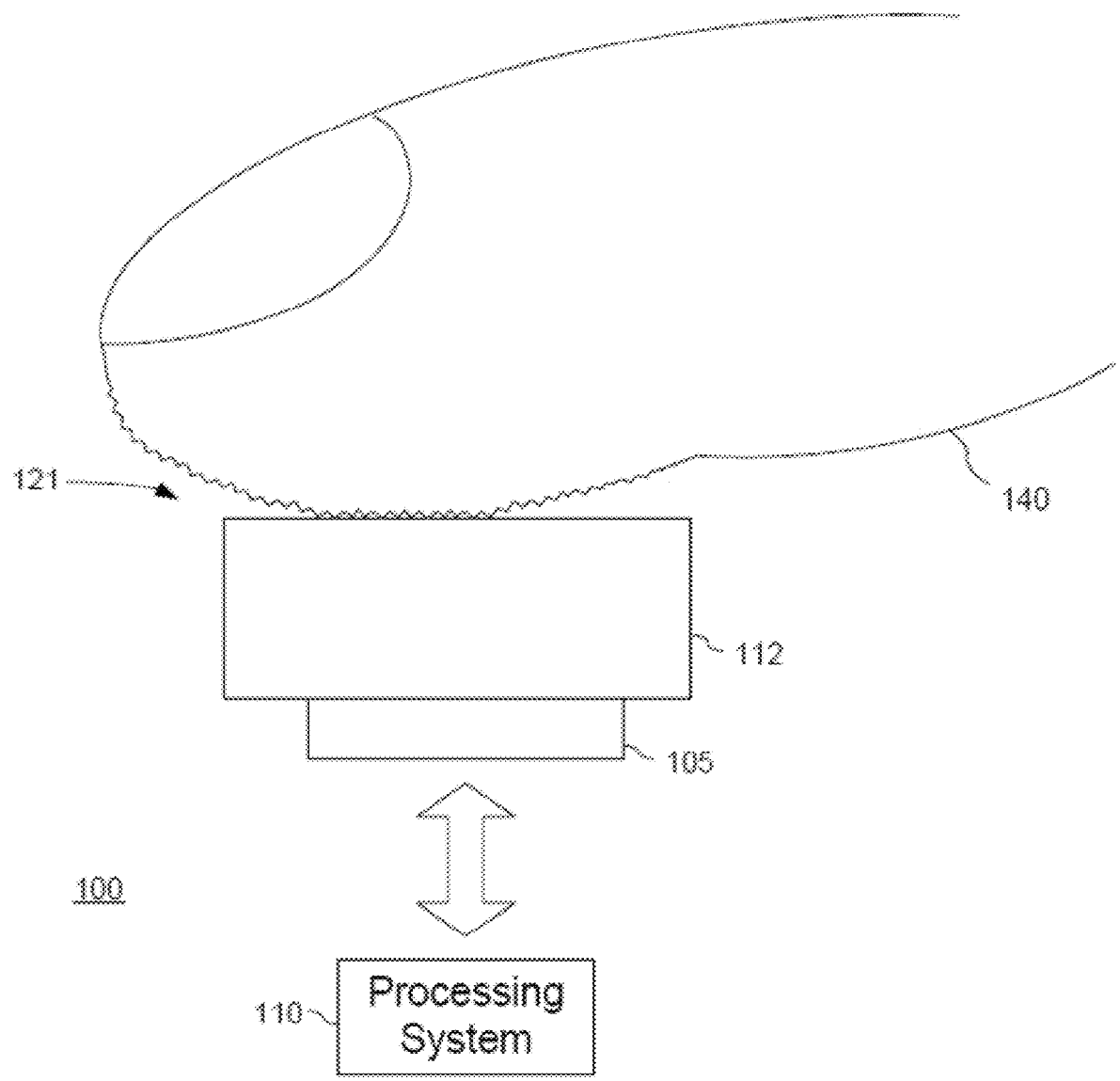

FIGS. 1A-1B are schematic/block diagrams depicting examples of an input device 100. FIGS. 1A-1B provide example environments to explain working principles of a sensor in connection with a processing system. The input device 100 may be configured to provide input to an electronic system. As used in this document, the term "electronic system" broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices, e.g., remote controllers and mice, and data output devices, e.g., display screens and printers. Other examples include remote terminals, kiosks, and video game machines, e.g., video game consoles, portable gaming devices, and the like. Other examples include communication devices, e.g., cellular phones such as smart phones, and media devices, e.g., recorders, editors, and players such as televisions, set-top boxes, music players, digital photo frames, and digital cameras. Additionally, the electronic system may be a host or a slave to the input device. The electronic system may also be referred to as an electronic device.

The input device 100 may be implemented as a physical part of the electronic system, or may be physically separate from the electronic system. In one embodiment, the electronic system may be referred to as a host device. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1A, the input device 100 is shown as a capacitive sensor device configured to sense input provided by one or more input objects 140 in a sensing region 120. Example input objects 140 include fingers and styli, as shown in FIG. 1A. An exemplary capacitive sensor device may be a touchpad, a touchscreen, a touch sensor device, and the like.

Sensing region 120 encompasses any space above, around, in and/or near the input device 100 in which the input device 100 is able to detect user input, e.g., user input provided by one or more input objects 140. The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises: no contact with any surfaces of the input device 100; contact with an input surface, e.g., a touch surface, of the input device 100; contact with an input surface of the input device 100 coupled with some amount of applied force or pressure; and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may utilize capacitive sensing, and may further utilize elastive, resistive, inductive, magnetic, acoustic, ultrasonic, and/or optical techniques.

Some implementations are configured to provide images (e.g., of capacitive signals) that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self-capacitance" (also often referred to as "absolute capacitance") sensing methods based on changes in the capacitive coupling between sensor electrodes and an input object (e.g., between a system ground and freespace coupling to the user). In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage, e.g., system ground, and by detecting the capacitive coupling between the sensor electrodes and input objects. In some implementations sensing elements may be formed of a substantially transparent metal mesh (e.g., a reflective or absorbing metallic film patterned to reduce or minimize visible transmission loss from the display subpixels). Further, the sensor electrodes may be disposed over a display of a display device. The sensing electrodes may be formed on a common substrate of a display device (e.g., on the encapsulation layer of a rigid or flexible organic light emitting diode (OLED) display). An additional dielectric layer with vias for a jumper layer may also be formed of a substantially transparent metal mesh material (e.g., between the user input and the cathode electrode). Alternately, the sensor may be patterned on a single layer of metal mesh over the display active area with cross-overs outside of the active area. The jumpers of the jumper layer may be coupled to the electrodes of a first group and cross over sensor electrodes of a second group. In one or more embodiments, the first and second groups may be orthogonal axes to each other. Further, in various embodiments, the absolute capacitance measurement may comprise a profile of the input object couplings accumulated along one axis and projected onto the other. In various embodiments, a modulated input object (e.g., a powered active stylus) may be received by the orthogonal electrode axes without modulation of the corresponding electrodes (e.g., relative to a system ground). In such an embodiment, both axes may be sensed simultaneously and combined to estimate stylus position.

Some capacitive implementations utilize "mutual capacitance" (also often referred to as "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also referred to herein as "transmitter electrodes" or "transmitters") and one or more receiver sensor electrodes (also referred to herein as "receiver electrodes" or "receivers"). The coupling may be reduced when an input object coupled to a system ground approaches the sensor electrodes. Transmitter sensor electrodes may be modulated relative to a reference voltage, e.g., system ground, to transmit transmitter signals. Receiver sensor electrodes may be held substantially constant relative to the reference voltage or modulated relative to the transmitter sensor electrodes to facilitate receipt of resulting signals. A resulting signal may comprise effect(s) corresponding to one or more transmitter signals, and/or to one or more sources of environmental interference, e.g., other electromagnetic signals. Sensor electrodes may be dedicated transmitters or receivers, or may be configured to both transmit and receive.

In FIG. 1A, a processing system 110 is shown as part of the input device 100. The processing system 110 is configured to operate the hardware of the input device 100 to detect input in the sensing region 120. The processing system 110 comprises parts of or all of one or more integrated circuits (ICs) chips and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (in another embodiment, with associated firmware) separate from the central processing unit. As another example, the input device 100 may be physically integrated in a phone, and the processing system 110 may comprise circuits and firmware that are part of a main processor (e.g., a mobile device application processor or any other central processing unit) of the phone. In some embodiments, the processing system 110 is dedicated to implementing the input device 100. In other embodiments, the processing system 110 also performs other user input functions, such as operating display screens, measuring input forces, measuring tactile switch state, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system, e.g., to a central processing system of the electronic system that is separate from the processing system 110, if such a separate central processing system exists. In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. The filtering may comprise one or more of demodulating, sampling, weighting, and accumulating of analog or digitally converted signals (e.g., for FIR digital or IIR switched capacitor filtering) at appropriate sensing times. The sensing times may be relative to the display output periods (e.g., display line update periods or blanking periods). As yet another example, the processing system 110 may subtract or otherwise account for a baseline, such that the information reflects a difference between the electrical signals from user input and the baseline signals. A baseline may account for display update signals (e.g., subpixel data signal, gate select and deselect signal, or emission control signal) which are spatially filtered (e.g., demodulated and accumulated) and removed from the lower spatial frequency sensing baseline. Further, a baseline may compensate for a capacitive coupling between the sensor electrodes and one or more nearby electrodes. The nearby electrodes may be display electrodes, unused sensor electrodes, and or any proximate conductive object. The baseline compensation may be provided digitally and/or via analog components. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1A shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touchscreen interface, and the sensing region 120 overlaps at least part of a display screen. For example, the sensing region 120 may overlap at least a portion of an active area of a display screen (or display panel). The active area of the display panel may correspond to a portion of the display panel where images are updated. In one or more embodiments, the input device 100 may comprise substantially transparent sensor electrodes (e.g., ITO, metal mesh, etc.) overlaying the display screen and provide a touchscreen interface for the associated electronic system. The display panel may be any type of dynamic display capable of displaying a visual interface to a user, and may include any type of light emitting diode (LED), OLED, cathode ray tube (CRT), liquid crystal display (LCD), plasma, electroluminescence (EL), or other display technology. The input device 100 and the display panel may share physical elements. For example, some embodiments may utilize some of the same electrical components for displaying and sensing. As another example, the display panel may be operated in part or in total by the processing system 110.

A cathode electrode of an OLED display may provide a low impedance screen between one or more display electrodes and the sensor electrodes which may be separated by a thin encapsulation layer. For example, the encapsulation layer may be about 10 um. Alternatively, the encapsulation layer may be less than 10 μm or greater than 10 um. Further, the encapsulation layer may be comprised of a pin hole free stack of conformal organic and inorganic dielectric layers.

It should be understood that while many embodiments of the disclosure are described in the context of a fully functioning apparatus, the mechanisms of the disclosure are capable of being distributed as a program product, e.g., software, in a variety of forms. For example, the mechanisms of the disclosure may be implemented and distributed as a software program on information bearing media that are readable by electronic processors, e.g., non-transitory computer-readable and/or recordable/writable information bearing media readable by the processing system 110. Additionally, the embodiments of the disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

FIG. 1B is a block diagram depicting the input device 100 as including a fingerprint sensor 105. The fingerprint sensor 105 is configured to capture an image of the fingerprint from a finger 140. The fingerprint sensor 105 is disposed underneath a cover layer 112 that provides an input surface for the fingerprint to be placed on or swiped over the fingerprint sensor 105. The sensing region 121 may include an input surface with an area larger than, smaller than, or similar in size to a full fingerprint. The fingerprint sensor 105 has an array of sensing elements with a resolution configured to detect surface variations of the finger 140. In certain embodiments, the fingerprint sensor 105 may be disposed within the active area of a display.

Figure 2A:
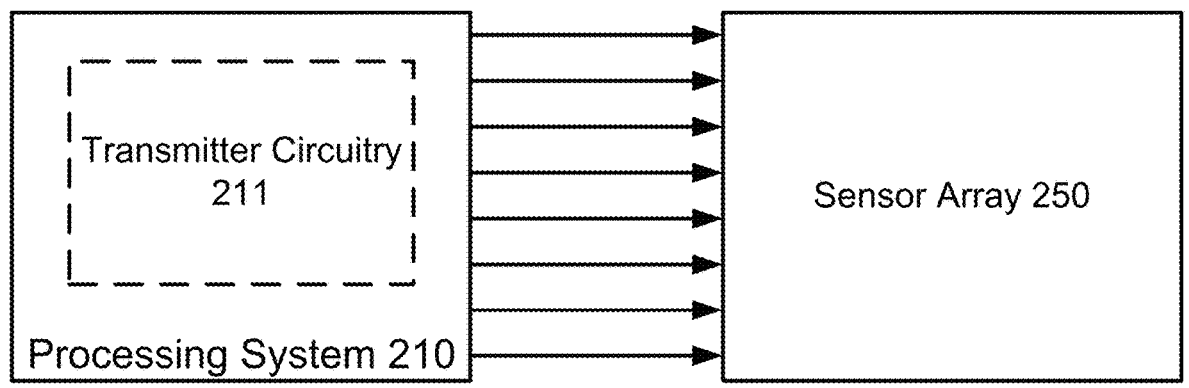
FIGS. 2A-2B are block diagrams depicting a processing system and a sensor array of an example input device according to an exemplary embodiment of the present disclosure.
Figure 2B:
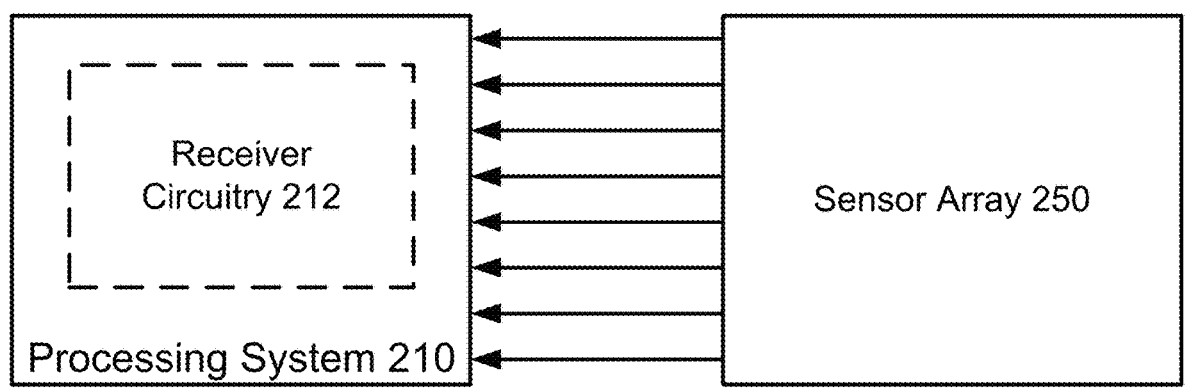
Figure 5:
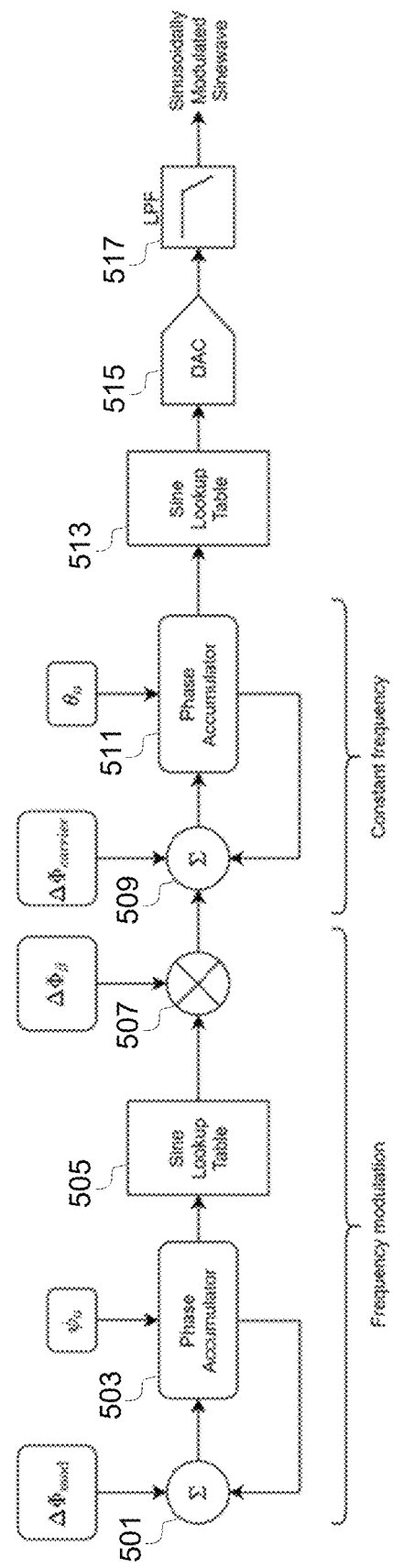
FIG. 5 is a block diagram depicting an example of transmitter circuitry for generating a sinusoidally modulated sinewave for a respective transmitter channel according to an exemplary embodiment of the present disclosure.

FIGS. 2A-2B are block diagrams depicting a processing system 210 and a sensor array 250 of an example input device. As shown in FIG. 2A, the processing system 210 may include transmitter circuitry 211 for generating sensing signals corresponding to a plurality of transmitter channels and outputting the sensing signals to respective sensor electrodes of the sensor array 250. The transmitter circuitry 211 may include, for example, various components for generating sensing signal waveforms (e.g., as depicted in FIG. 5 and discussed below in connection therewith). In a transcapacitive sensing example, the sensor electrodes driven with the sensing signals of the transmitter channels may be transmitter electrodes, and the sensor array 250 may be a two-dimensional array of transmitter and receiver electrodes (e.g., in a bars-and-stripes pattern, a diamond pattern, or other sensor array patterns). In an absolute sensing example, the sensor electrodes driven with the sensing signals of the transmitter channels may be sensor electrodes arranged in a two-dimensional array, such as a grid of sensor electrodes.

Figure 6:
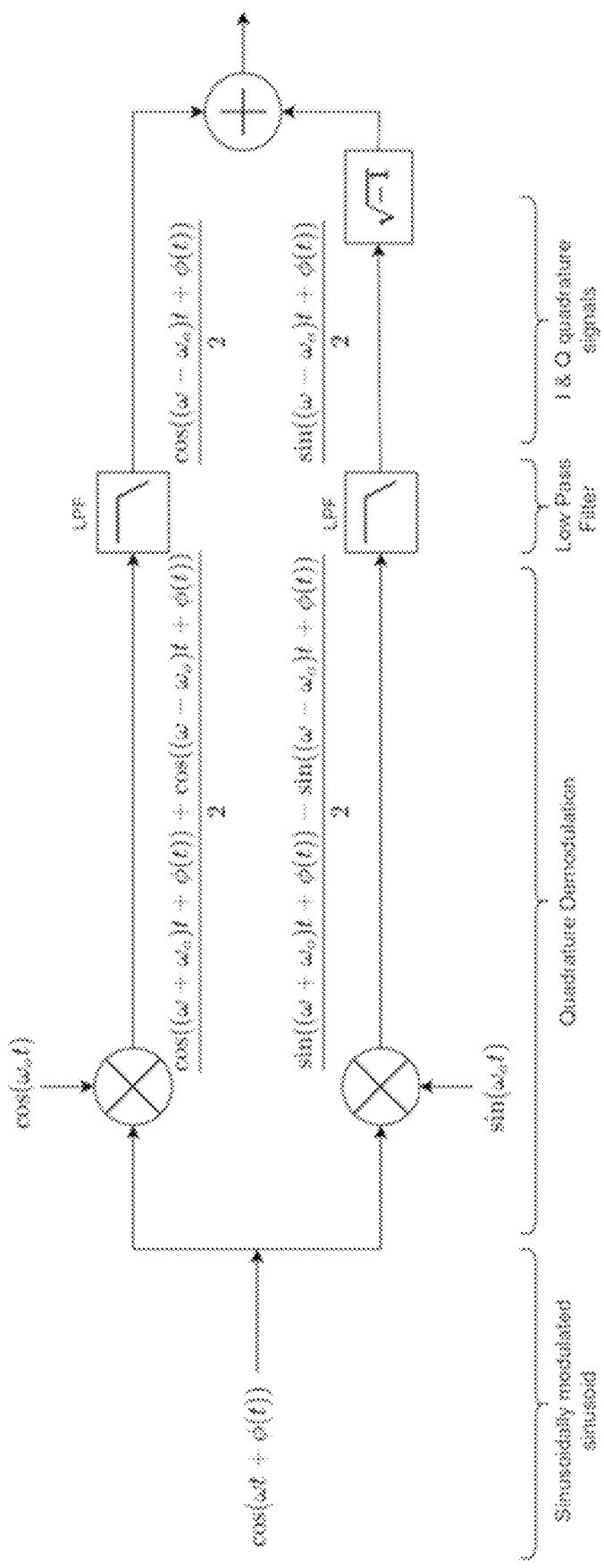
FIG. 6 is a block diagram depicting an example of receiver circuitry for demodulating resulting signals obtained from a sensor array according to an exemplary embodiment of the present disclosure.

As shown in FIG. 2B, the processing system 210 may further include receiver circuitry 212 for processing resulting signals obtained from the sensor array 250, for example, to determine presence of an input object, a position of an input object, movement of an input object, and/or features of an input object. The receiver circuitry 212 may include various components for processing the resulting signals, including, for example, an analog front end (AFE), an analog-to-digital converter (ADC), and one or more chips, controllers, or processors (e.g., as depicted in FIG. 6 and discussed below in connection therewith). In a transcapacitive sensing example, the resulting signals may be obtained from receiver electrodes of the sensor array 250. In an absolute sensing example, the resulting signals may be obtained from the same sensor electrodes of the sensor array 250 that are driven with the sensing signals.

It will be appreciated that the sensor array 250 of FIGS. 2A-2B in accordance with exemplary embodiments of the present disclosure may be any type of sensor array usable with a transcapacitance sensing scheme, any type of sensor array usable with an absolute capacitance sensing scheme, or any type of sensor array usable with both transcapacitance and absolute capacitance sensing schemes.

Exemplary embodiments of the present disclosure provide for controlling the instantaneous phases of a group of transmitters such that at any given instant, the aggregation of the transmitters does not exceed a desired threshold. For example, if two transmitters are oscillating at different fixed frequencies, there will be a beat frequency pattern wherein during certain instances the two constructively add and during other instances they destructively cancel. Now, suppose one of the transmitters is phase modulated. At t=0, the phases can be chosen such that the two destructively cancel. If the two transmitters are nearly the same frequency, then when the first one completes one cycle, then the second one will either be slightly more or slightly less than one cycle depending on the relative frequency. Looking at the phase of the second transmitter at each instant the first transmitter completes one cycle, there will be continuous advancement or retardation relative to the phase of the first transmitter. In this situation, with no phase control, the second transmitter's phase will eventually align with the first one's phase. However, the second transmitter's phase can be adjusted to change the instantaneous phase such that as it approaches the first one's phase, the phase advancement or retardation can be reversed.

In other words, exemplary embodiments provide for OFDM with phase modulation (also referred to as "frequency modulation" or "frequency/phase modulation"). Consider a sinusoid with a time varying phase term:

$$s_i(t)=A_i(t)\cos(2\pi f_o t+\phi_i(t)) \quad (1)$$

The amplitude $A_i(t)$ for an OFDM scheme is constant and the same for all transmitters. The frequency, $f_o$, is the carrier or reference frequency. $\phi_i(t)$ is the phase modulation term. For OFDM, $\phi_i(t)=k_i 2\pi f_{mod}t$. The OFDM modulation frequency, $f_{mod}$, is a constant and inversely proportional to the measurement window (this minimizes spectral leakage between adjacent OFDM frequencies). For example, if the measurement window is $T_w=10$ ms, then $f_{mod}=100$ Hz. The $i^{th}$ transmitter is driven at an integer, $k_i$, multiple of this. In a conventional OFDM scheme, the PAPR is relatively large. However, in exemplary embodiments of the present disclosure, $\phi_i(t)$ is configured in a manner different from conventional OFDM so as to minimize PAPR.

In an exemplary embodiment, the OFDM bands are phase modulated:

$$\phi_i(t)=k_i 2\pi f_{mod}t+\beta_i \cos(2\pi m_i f_{mod}t+\psi_i)+\theta_i \quad (2)$$

This type of modulation is also called, "frequency modulation," "sinusoidal modulation" or "sinusoidal frequency modulation (SFM)." Each transmitter is described by five parameters $\{\beta_i, \psi_i, \theta_i, k_i, m_i\}$, and for all transmitters there are two global frequencies $f_o$ and $f_{mod}$:

TABLE 1

| Parameter | Description |
| --- | --- |
| $f_o$ | Carrier frequency-reference frequency for the band of frequencies |
| $f_{mod}$ | Frequency modulation rate, $f_{mod} = 1/T_W$, where $T_W$ is the window (e.g., frame time). |
| $k_i$ | Integer selecting the OFDM band |
| $m_i$ | Integer selecting the modulation band |
| $\beta_i$ | Modulation depth (e.g., amplitude of sinusoidal phase modulation) |
| $\psi_i$ | Initial phase of the phase modulation |
| $\theta_i$ | Initial phase of the transmitter |

For OFDM-PM, $\beta_i$ is called the modulation depth or modulation index. This controls the range of frequencies over which the phase modulated waveform oscillates. $\beta_i$ plays a role in establishing the spectral peaks resulting from phase modulation (e.g., Bessel functions). The $\psi_i$ and $\theta_i$ parameters control the initial phase of the phase modulation function and the initial phase of the modulated sinewave. The $k_i$ parameter is applicable to OFDM and selects the tonal frequency around which modulation occurs. The $m_i$ parameter specifies how fast the transmitter is modulated.

In an exemplary embodiment, when all transmitters are being driven, the sum of the transmitter channels can be expressed as:

$$S(t) = \sum_{i=0}^{N_{TX}-1} A_i \cos(2\pi f_0 t + k_i 2\pi f_{mod}t + \beta_i \cos(2\pi m_i f_{mod}t + \psi_i) + \theta_i) \quad (3)$$

Further, this sum S(t) is constrained such that it does not exceed a predetermined peak, $S_{peak}$.

One way to constrain equation (3) is graphically with phasors. For this approach, a phasor is assigned to each transmitter in connection with equation (2) above. At t=0, $\phi_i(0)=\beta_i \cos(\psi_i)+\theta_i$, which describes the initial phase of transmitter. For example, if $$\psi_1 = \frac{\pi}{2} \text{ and } \theta_1 = \pi,$$

then the first phasor points in the $\phi_1(0)=\pi$ direction. At a later time, $$t = \frac{1}{4}T_w, \phi_1\left(\frac{1}{4}T_w\right) = -\beta_i + \pi,$$

which will reorient the phasor. Each transmitter is assigned its own phasor and has a similar representation. Then, graphically, the vector sum of the phasors can be constrained, for example, to be less than 1 unit.

Figure 3A:
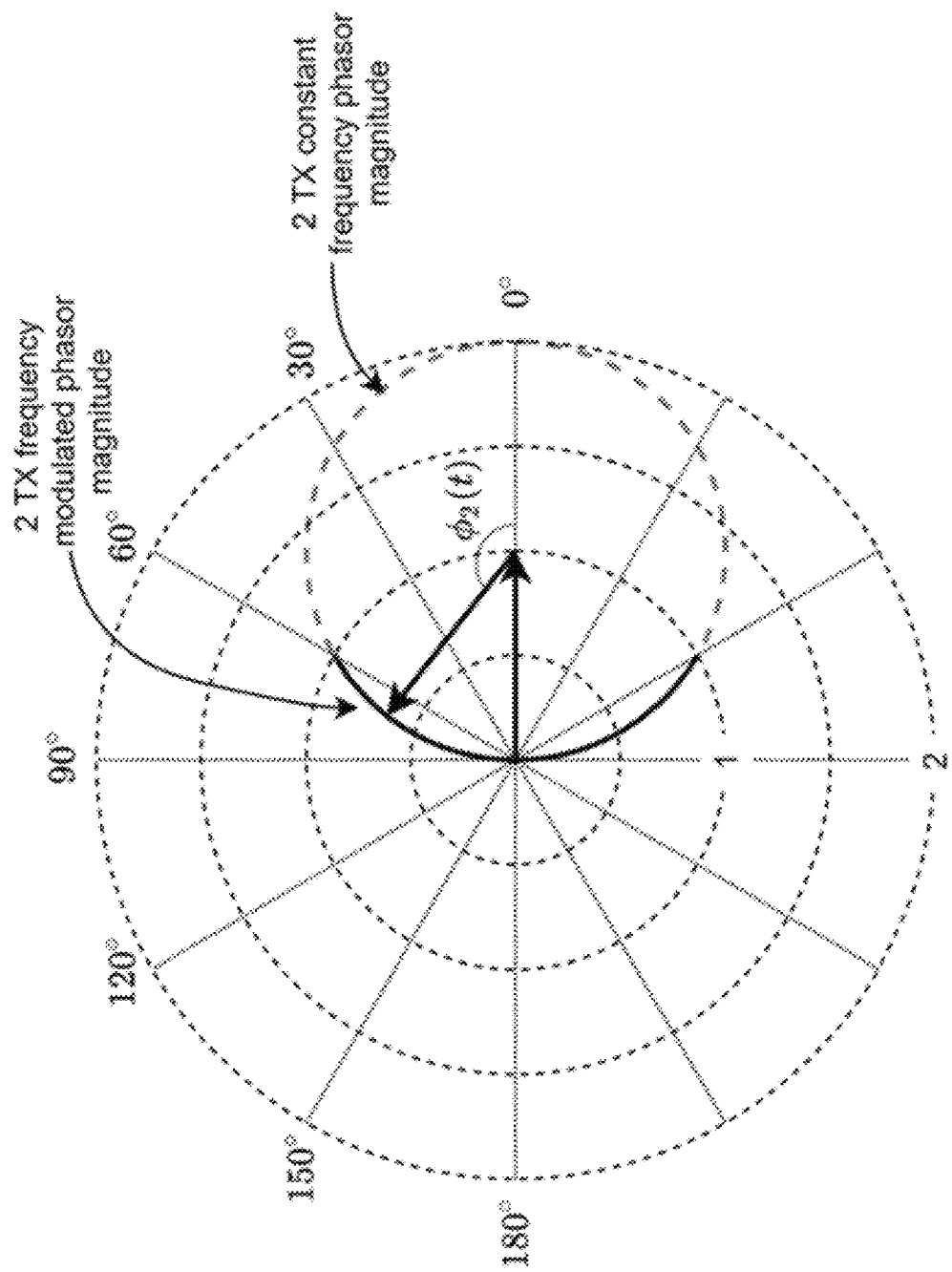
FIG. 3A is a phasor diagram depicting two transmitters in one example according to an exemplary embodiment of the present disclosure.

An example of this is shown in connection with FIG. 3A, which is a phasor diagram depicting two transmitters. To constrain the phasor sum of the two transmitters to a magnitude less than 1 unit, the angle between the phasors is limited to be greater than or equal to 120°. One transmitter's phasor is fixed at 0° ($\beta=0$, k=0, $\theta=0$), while the other phasor points in the opposite direction ($\theta=\pi$) and modulated $$120°\left(\beta = \frac{\pi}{3}, m > 0\right).$$

In other words, the first transmitter has a constant phase of 0°, while the second transmitter rotates relative to the first transmitter, and if the second transmitter rotates at a constant rate, then this is equivalent to a frequency shift relative to the first transmitter. The dashed circle shows a region of possible loci phasor sums between 0 and 2. Based on the rotation rate of the second phasor being phase modulated with the angle between the phasors being limited to being greater than or equal to 120°, the vector sum of the two phasors can be constrained to be ≤1 as shown using the solid lines and arrows in FIG. 3A.

Figure 3B:
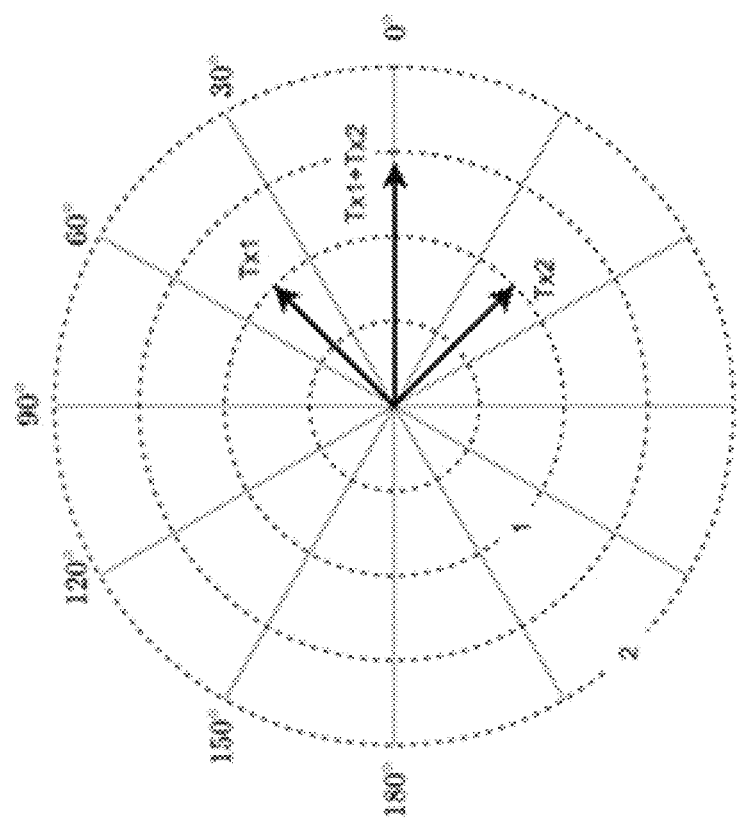
FIG. 3B includes two phasor diagrams depicting two transmitters in another example according to an exemplary embodiment of the present disclosure.
Figure 3B:
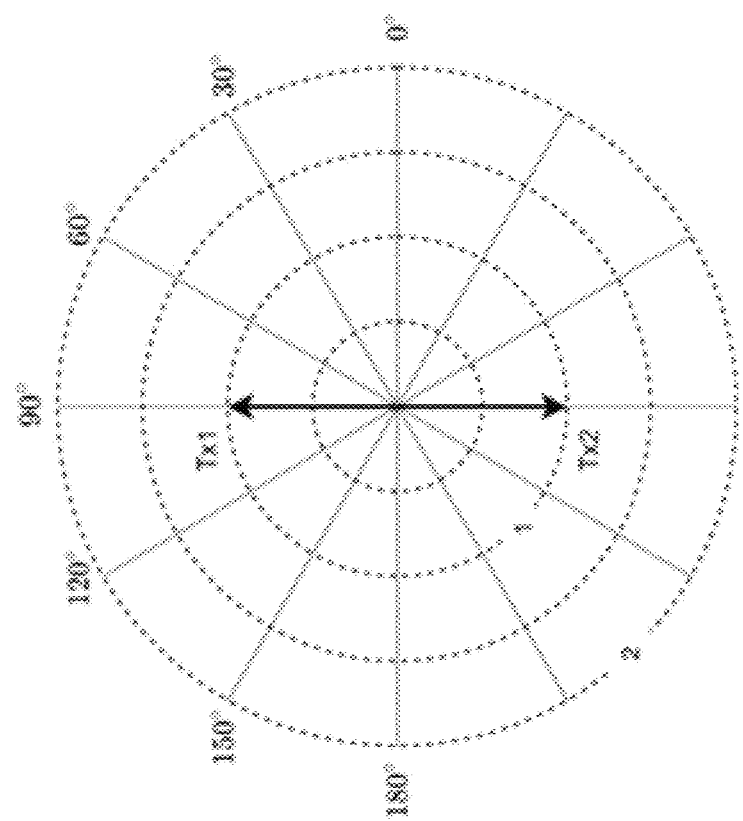

The graphical approach for solving equation (3) works well for a relatively small number of transmitters but may become more difficult for a larger number of transmitters. Another approach for constraining equation (3) is to consider transmitters in pairs, wherein each pair of phasors initially point in the opposite directions. Using this approach, the modulation scheme increases the phase of one phasor in a respective pair while decreasing the phase of the other phasor in the respective pair such that the phasor combination of the pair is constrained to a magnitude less than 1. As shown in FIG. 3B, one phasor points along the positive imaginary axis while the other in the negative direction, their combined magnitude is zero and thus they cancel. Then, as modulation commences, one phasor rotates clockwise while the other counterclockwise, and the magnitude increases. When the magnitude reaches 1, the phasors reverse their respective rotations. The magnitude then decreases and at a certain point the phasors return to their original orientation and exactly cancel. The rotation continues until the phasors constructively combine to 1.

The example shown in FIG. 3A is for two transmitters, and the example shown in FIG. 3B is for a single pair of two transmitters. Exemplary embodiments of the present disclosure further provide for scaling up to N transmitters, where N is a positive integer and can be very large (e.g., virtually any number of transmitters up to infinity). In the case of scaling up to N transmitters, there are certain constraints and rules which may be applied:

While it is possible for more than two transmitters to share the same $k_i$ (for OFDM, this would be two transmitters oscillating at the same frequency but phase-shifted 90°), decoding may become more difficult. Thus, for practical reasons, only one or two transmitters may be permitted to occupy the same $k_i$.

For two transmitters which share the same $k_i$, the modulation depth for one can be 0 (or very close to 0) and the other is non-zero. For the transmitter with $\beta\cong 0$, the modulation rate ($m_i$) is less relevant. If both transmitters have moderate modulation depths, then the modulate rates are different. This constraint ensures that the phase between two transmitters sharing the same OFDM band have varying phase.

The modulation rate and modulation band can be different (i.e., $k_i$ does not have to equal $m_i$).

For a pair of transmitters occupying the same modulation band (same $k_i$), then without loss of generality, the initial modulation phase can be $\psi_i=180°$.

For a system of multiple pairs of transmitters, the initial phase can be $\theta_i=180°$.

Figure 4:
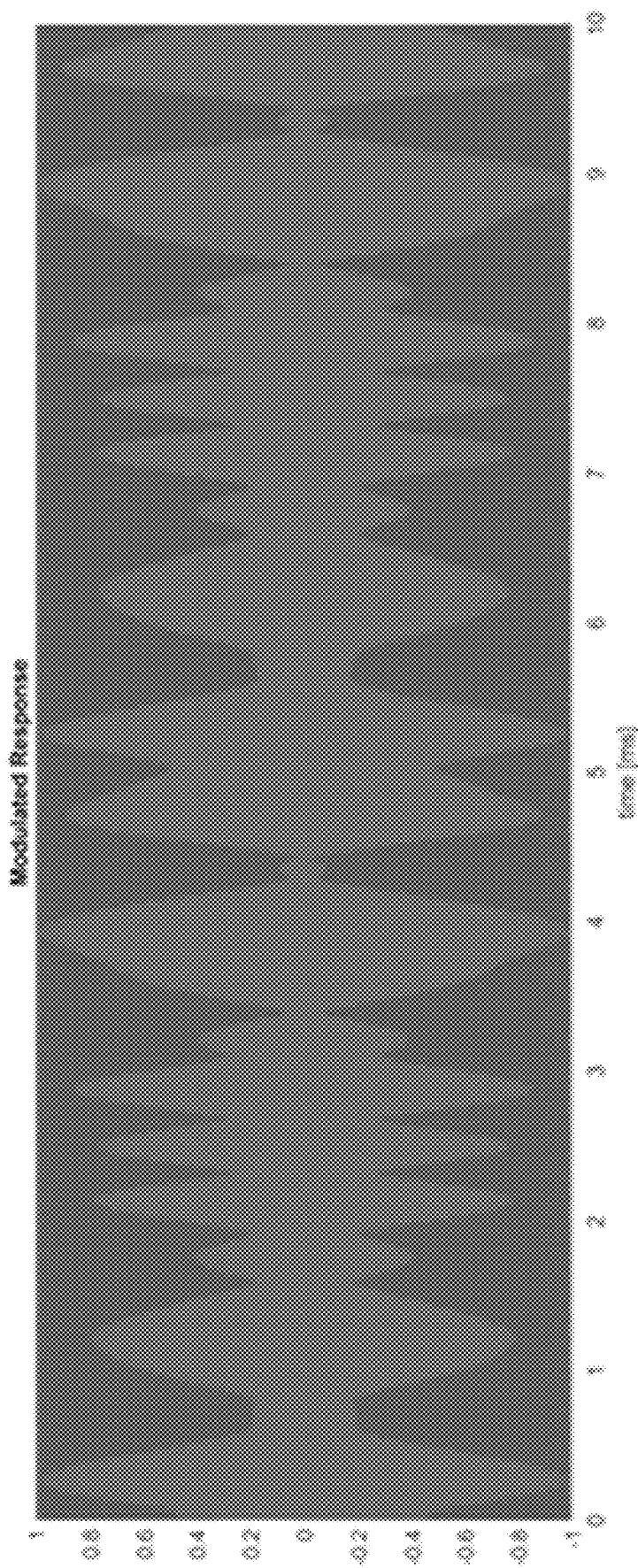
FIG. 4 is a plot depicting an aggregate amplitude of 18 transmitter channels over time according to an exemplary embodiment of the present disclosure.

A numeric optimization algorithm, such as the Nelder-Mead simplex method, may be utilized to apply the foregoing constraints and rules. FIG. 4 illustrates an example plot of the aggregate amplitude for 18 transmitters where each transmitter has amplitude of 1 unit, and the sum of all 18 transmitters does not exceed ±1, thereby minimizing PAPR for the 18-transmitter system in accordance with an exemplary implementation of the disclosure.

Once equation (3) has been solved such that a set of parameters have been determined, respective OFDM-PM sinewaves are synthesized for respective transmitter channels using transmitter circuitry of a processing system (in an exemplary embodiment, each transmitter has 5 parameters associated therewith, so in a system with N transmitters, there will be 5*N parameters). In an exemplary embodiment, synthesizing OFDM-PM sinewaves may utilize techniques applicable to synthesizing fixed-frequency sinewaves. One approach is to use phase accumulators and lookup tables. Another approach includes tabulating the drive level for each transmitter at each time step and directly driving a DAC.

For example, with respect to the approach using phase accumulators and lookup tables, consider the sinusoid:

$$s(t)=A\cos(\phi(t)) \quad (4)$$

For a fixed frequency sinewave, $\phi(t)=2\pi ft$. Take the derivative of the phase and then integrate it:

$$\phi(t) = \int \frac{d\phi}{dt}dt \cong \sum_{i=0}^{i<\left\lfloor\frac{t}{\Delta t}\right\rfloor} \frac{d\phi}{dt}\Delta t \quad (5)$$

In other words, the summation approximates the phase by applying a zero-order hold summation to the derivative of the phase. For a fixed frequency sinewave, $$\frac{d\phi}{dt} = 2\pi f = \text{constant.}$$

And if the time step is constant, the sum simplifies to:

$$\phi(t) = 2\pi f \left\lfloor\frac{t}{\Delta t}\right\rfloor \Delta t \quad (6)$$

This is seen to be the quantized version of $\phi(t)=2\pi ft$. The constants can be lumped together and then the phase can be recursively obtained by:

$$\phi_{i+1}=\phi_i+\Delta\phi \quad (7)$$

where $$\Delta\phi = \frac{d\phi}{df}\Delta t.$$

For a fixed frequency sinusoid, $\Delta\phi=2\pi f\Delta t$. The second part of the phase accumulator is to note that the phase rolls over every $2\pi$ radians. The rollover can be accommodated with modulo $2\pi$ arithmetic. However, an efficient approach is to quantize the phase to an N-bit unsigned integer. In other words, let $$\phi_q \leftarrow (\phi \bmod 2\pi)\frac{2^N}{2\pi}.$$

This produces a quantized phase that ranges from 0 to $2^N-1$. Since the quantized phase is an unsigned integer, the modulo operation is automatically obtained whenever the sum exceeds $2^N-1$.

Here's an example: Suppose N=3 which quantizes the phase to $2^N=8$ levels ranging from 0 to 7. Next, suppose the $\Delta\phi=2\pi f\Delta t=3$. If the initial phase is 0, then the quantized phase sequences through these values is 0, 3, 6, 1, 4, 7, 2, 5, 0, 3, . . . . The phase rolls over whenever the sum exceeds 7. For example, when $\phi_q=6$, then on the next iteration $\phi_q=6+3=9$ mod $8=1$. For a practical implementation, N is made much larger.

Now that a quantized expression for the phase is available, it can be used as an index into a lookup table. The lookup table is a tabulation of the cosine function at the quantized phases. For example, if an 8-bit quantized phase is desired, then the cosine is tabulated at 256 points:

$$LUT(i) = \cos\left(2\pi\frac{i}{256}\right).$$

The symmetry of the cosine may be exploited to reduce the size of the table. Combining the phase accumulator with the lookup table leads to:

$$\cos(2\pi ft) \equiv LUT(\phi_q) \quad (8)$$

where time is quantized as $t=i\Delta t$ and phase quantized as $$\phi_q = (\phi_i \bmod 2\pi)\frac{2^N}{2\pi} \text{ and } \phi_{i+1} = \phi_i + \Delta\phi.$$

The phase accumulator approach for synthesizing OFDM-PM sinewaves is similar. Starting with the expression of the phase for the $i^{th}$ transmitter:

$$\phi_i(t)=2\pi(f_o+k_i f_{mod})t+\beta_i \cos(2\pi m_i f_{mod}t+\psi_i)+\theta_i \quad (9)$$

Taking the derivative leads to:

$$\frac{d\phi_i(t)}{dt} = 2\pi(f_0 + k_i f_{mod}) - 2\pi m_i f_{mod}\beta_i \sin(2\pi m_i f_{mod}t + \psi_i) \quad (10)$$

Next, combining the constants leads to:

$$\frac{d\phi_i(t)}{dt} = \Delta\phi_K + \Delta\phi_M \sin(2\pi m_i f_{mod}t + \psi_i) \quad (11)$$

The constant phase term, $\Delta\phi_K$, is identical to the phase term seen for fixed frequency sinewaves. The modulation phase term, $\Delta\phi_M$, is the amplitude of phase modulation.

The next step is to express the phase modulation with a phase accumulator. The sine term in equation (11) is a fixed frequency sinusoid. The phase accumulator can be initiated with the proper phase to obtain a sine instead of a cosine. Similarly, the initialization can account for $\psi_i$. Substituting equation (8) leads to:

$$\frac{d\phi_i(t)}{dt} = \Delta\phi_K + \Delta\phi_M LUT(\phi_{qmod}) \quad (12)$$

The phase modulated sinewave is cos ($\phi_i(t)$). Using the phase accumulator derivation from above and the expression for the derivative of the phase results in:

$$\cos(\phi_i(t))=LUT(\Delta\phi_K+\Delta\phi_M LUT(\phi_{qmod})) \quad (13)$$

It will be appreciated that while the foregoing examples discuss using phase modulation to achieve a desired PAPR, other forms of modulation are possible. For example, square waves may replace sinewaves in equation (2). Additional system constraints such as preserving amplitude continuity across square wave steps may be taken into consideration. However, minimizing the peak of a sum of equal amplitude transmitters is still achievable.

FIG. 5 is a block diagram depicting an example of transmitter circuitry for generating a phase modulated sinewave for a respective transmitter channel. At stage 501, a $\Delta\Phi_{mod}$ signal is summed with a signal from phase accumulator 503 and output to the phase accumulator 503, which also takes as input a $\psi_0$ signal. The output of the phase accumulator 503 is provided to sine lookup table 505, and the output of sine lookup table 505 is mixed or otherwise combined with $\Delta\Phi_\beta$ at stage 507, and the result is then summed with $\Delta\Phi_{carrier}$ at stage 509 along with a signal from phase accumulator 511, which also takes as input a $\theta_0$ signal. The output of phase accumulator 511 is provided to sine lookup table 513, and the output of sine lookup table 513 is provided through a digital-to-analog converter 515 followed by a low-pass filter 517 to generate a phase modulated sinewave for the respective transmitter channel.

In order to obtain sensor data corresponding presence, position, motion, and/or features of an input object in a sensing region in connection with the modulation techniques discussed in the foregoing embodiments, a demodulation process is performed. The demodulation process may follow OFDM. For OFDM, one method for demodulation is to multiply the received signal by a complex sinusoid centered at the carrier frequency. This produces a real and imaginary stream that each can be low pass filtered and decimated. The purpose of the complex exponential is for quadrature information. A real sinusoid may also be used.

A single phase-modulated transmitter is expressed in terms of complex exponentials as follows:

$$\cos(\omega t + \phi(t)) = \frac{e^{j\omega t}e^{j\phi(t)} + e^{-j\omega f}e^{-j\phi(t)}}{2} \quad (4)$$

Demodulate by $e^{-j\omega t}$ $$\cos(\omega t + \phi(t))e^{-j\omega t} = \frac{e^{j\phi(t)} + e^{-j2\omega t}e^{-j\phi(t)}}{2} \quad (5)$$

Apply a low pass filter $$LPF\big(\cos(\omega t + \phi(t))e^{-j\omega t}\big) = \frac{1}{2}e^{j\phi(t)} \quad (6)$$

Thus, the phase modulated portion, $e^{j\phi(t)}$, is preserved. This is applicable where phase modulation is small relative to the carrier. The phase expression from equation 2 can be substituted, allowing for analysis of the phase modulation independent of the carrier frequency.

The phase modulation complicates the signal decoding in that the separation of frequencies one sees with OFDM no longer holds. However, considering a pair of transmitters allocated to a single OFDM frequency band such that one is driven with a constant tone while the other is modulated allows for the decoding to become simpler. This is somewhat analogous to OFDM where two transmitters are in quadrature. For the OFDM case, the phase of the spectrum is used to differentiate the two. For the OFDM-PM case, the spectrum of the modulated transmitter is spread out. The spectral spreading depends on the modulation depth, $\beta$, and the modulation rate, m. For the many-transmitter case, adjacent frequency bands may overlap. However, no information is lost, and there is a mapping from the overlapped case to the non-overlapped case. This mapping is straightforward, but if viewed too onerous, the modulation bands can be spread far enough apart to avoid adjacent band overlapping.

With regards to demodulation, in general, OFDM exploits the orthonormality between carriers. If the transmitter waveforms are orthogonal, then the receiver can selectivity isolate them from one another by forming the proper inner product. The same property holds for frequency modulation. However, it should be noted that the process of modulation incurs a certain spectral broadening. Thus in the example above, the spacing may need to be every other channel slot, e.g., $$f_i = Ki\frac{1}{T} \text{ with } K = 2.$$

For the square wave modulation, the frequency shift is instantaneous. Certain windowing operations may ameliorate the discontinuities.

For example, in the case of there being 3 OFDM frequencies $f_{i-1}$, $f_i$, $f_{i+1}$, without intervention, the PAPR could reach 3. However, with square wave modulation $f_i$ can be kept constant and exchange $f_{i-1} \leftrightarrow f_{i+1}$ at strategic instants in time such that $|\Sigma_i f_i| \leq 1$. Those instants in this example are $$t = k\frac{T}{8} \text{ for } k = 1, 2, \ldots 7.$$

FIG. 6 is a block diagram depicting an example of receiver circuitry for demodulating resulting signals obtained from a sensor array. As shown in FIG. 6, a sinusoidally modulated sinusoid is put through a quadrature demodulation process, low-pass filtered, and then output in the form of combined I/Q quadrature signals.

Figure 7:
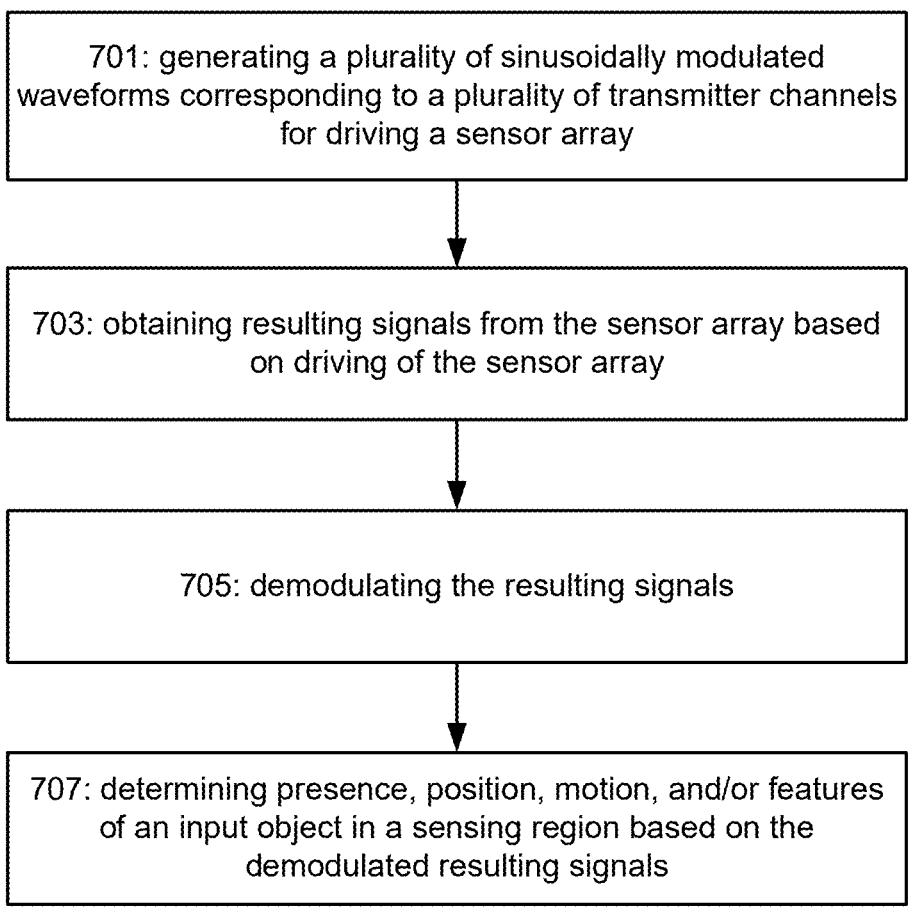
FIG. 7 is a flowchart depicting a process for determining presence, location, motion, and/or features of an input object according to an exemplary embodiment of the present disclosure.

FIG. 7 is a flowchart depicting a process for determining presence, location, motion, and/or features of an input object according to an exemplary embodiment of the present disclosure. At stage 701, a plurality of sinusoidally modulated waveforms corresponding to a plurality of transmitter channels (e.g., sensing signals) are generated for driving a sensor array, and while driving the sensor array, instantaneous phases of the sensing signals may be adjusted. In certain example embodiments, each of the plurality of transmitter channels corresponds to a different physical transmitter. In other example embodiments, multiple or all of the plurality of transmitter channels are generated by a single physical transmitter. At stage 703, resulting signals are obtained from the sensor array based on driving of the sensor array. At stage 705, the resulting signals are demodulated, and at stage 707, the presence, position, motion, and/or features of an input object in a sensing region of the sensor array is determined based on the demodulated resulting signals.

The above-discussed embodiments of the present disclosure are capable of being combined with differential sensing, which may significantly reduce dynamic range requirements (due to interference being spatially correlated with respect to differential sensing). Taking the difference between two closely spaced electrodes tends to cancel the common mode interference they experience, and it has been shown that there may be a nearly 20 dB reduction (a factor of ten) in peak interference current. Applying the driving scheme discussed herein thus is able to achieve a reduction in dynamic range of ~26 dB when compared to a 20 transmitter OFDM system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system, comprising:
a plurality of sensor electrodes; and
a processing system, wherein the processing system is configured to:
drive sensor electrodes of the plurality of sensor electrodes with sensing signals corresponding to a plurality of frequencies;
adjust, while driving the sensor electrodes of the plurality of sensor electrodes with the sensing signals, instantaneous phases of the sensing signals, wherein adjusting the instantaneous phases of the sensing signals comprises increasing a phase of a first phasor corresponding to a first sensing signal for a first transmitter electrode of a pair of sensor electrodes while decreasing a phase of a second phasor corresponding to a second sensing signal for a second transmitter electrode of the pair of sensor electrodes; and
obtain, via at least one sensor electrode of the plurality of sensor electrodes, resulting signals corresponding to the sensing signals, wherein the resulting signals are indicative of one or more of presence, position, motion, or features of one or more input objects;
wherein the processing system is configured to constrain a sum of the first and second phasors to be within a maximum magnitude;
wherein the processing system is configured to adjust the instantaneous phases of the sensing signals such that, while driving the sensor electrodes with the sensing signals, the first phasor rotates clockwise while the second phasor rotates counterclockwise;
wherein the processing system is further configured to adjust the instantaneous phases of the sensing signals such that, while driving the sensor electrodes with the sensing signals, the first and second phasors each reverse rotation upon a sum of the first and second phasors reaching the maximum magnitude at a point where the first and second phasors have the same phase;
wherein prior to the first and second phasors reversing rotation, the clockwise rotation of the first phasor and the counterclockwise rotation of the second phasor causes the sum of the first and second phasors to increase; and
wherein after the first and second phasors reverse rotation, the first phasor rotates counterclockwise and the second phasor rotates clockwise, and the counterclockwise rotation of the first phasor and the clockwise rotation of the second phasor causes the sum of the first and second phasors to decrease.

2. The system according to claim 1, wherein the plurality of sensor electrodes comprise absolute capacitance sensor electrodes, and the resulting signals are obtained from the same sensor electrodes as are driven with the sensing signals.

3. The system according to claim 1, wherein the plurality of sensor electrodes comprise:
transmitter electrodes corresponding to the sensor electrodes driven with sensing signals; and
at least one receiver electrode corresponding to the at least one sensor electrode via which the resulting signals are obtained.

4. The system according to claim 1, wherein the processing system comprises a plurality of transmitter circuits, wherein each transmitter circuit is configured to generate a respective sensing signal corresponding to a respective waveform.

5. The system according to claim 4, wherein each respective waveform is a sinusoidally modulated sinewave.

6. The system according to claim 4, wherein the plurality of transmitter circuits are configured to generate a set of orthogonal frequency division multiplexing (OFDM) with phase modulation (PM) (OFDM-PM) signals.

7. The system according to claim 1, wherein the instantaneous phase adjustment is configured to constrain amplitude.

8. The system according to claim 1, wherein driving the sensor electrodes of the plurality of sensor electrodes with sensing signals corresponding to the plurality of frequencies includes driving at least two respective sensor electrodes with the same frequency and driving at least two respective sensor electrodes with different frequencies.

9. The system according to claim 1, wherein the instantaneous phase adjustment is configured to limit a sum of all voltages of the sensing signals to be less than or equal to a peak voltage.

10. A processing system, comprising:
transmitter circuitry configured to:
drive sensor electrodes of a plurality of sensor electrodes with sensing signals corresponding to a plurality of frequencies; and
adjust, while driving the sensor electrodes of the plurality of sensor electrodes with the sensing signals, instantaneous phases of the sensing signals, wherein adjusting the instantaneous phases of the sensing signals comprises increasing a phase of a first phasor corresponding to a first sensing signal for a first transmitter electrode of a pair of sensor electrodes while decreasing a phase of a second phasor corresponding to a second sensing signal for a second transmitter electrode of the pair of sensor electrodes; and
receiver circuitry configured to:
obtain, via at least one sensor electrode of the plurality of sensor electrodes, resulting signals corresponding to the sensing signals, wherein the resulting signals are indicative of one or more of presence, position, motion, or features of one or more input objects;
wherein the transmitter circuitry is configured to constrain a sum of the first and second phasors to be within a maximum magnitude;
wherein the transmitter circuitry is configured to adjust the instantaneous phases of the sensing signals such that, while driving the sensor electrodes with the sensing signals, the first phasor rotates clockwise while the second phasor rotates counterclockwise;
wherein the transmitter circuitry is further configured to adjust the instantaneous phases of the sensing signals such that, while driving the sensor electrodes with the sensing signals, the first and second phasors each reverse rotation upon a sum of the first and second phasors reaching the maximum magnitude at a point where the first and second phasors have the same phase;
wherein prior to the first and second phasors reversing rotation, the clockwise rotation of the first phasor and the counterclockwise rotation of the second phasor causes the sum of the first and second phasors to increase; and
wherein after the first and second phasors reverse rotation, the first phasor rotates counterclockwise and the second phasor rotates clockwise, and the counterclockwise rotation of the first phasor and the clockwise rotation of the second phasor causes the sum of the first and second phasors to decrease.

11. The processing system according to claim 10, wherein the transmitter circuitry comprises a plurality of transmitter circuits, wherein each transmitter circuit is configured to generate a respective sensing signal corresponding to a respective waveform.

12. The processing system according to claim 10, wherein driving the sensor electrodes of the plurality of sensor electrodes with sensing signals corresponding to the plurality of frequencies includes driving at least two respective sensor electrodes with the same frequency and driving at least two respective sensor electrodes with different frequencies.

13. The processing system according to claim 10, wherein the instantaneous phase adjustment is configured to limit a sum of all voltages of the sensing signals to be less than or equal to a peak voltage.

14. A method, comprising:
- driving sensor electrodes of a plurality of sensor electrodes with sensing signals corresponding to a plurality of frequencies;
- adjusting, while driving the sensor electrodes of the plurality of sensor electrodes with the sensing signals, instantaneous phases of the sensing signals, wherein adjusting the instantaneous phases of the sensing signals comprises increasing a phase of a first phasor corresponding to a first sensing signal for a first transmitter electrode of a pair of sensor electrodes while decreasing a phase of a second phasor corresponding to a second sensing signal for a second transmitter electrode of the pair of sensor electrodes; and
- obtaining, via at least one sensor electrode of the plurality of sensor electrodes, resulting signals corresponding to the sensing signals, wherein the resulting signals are indicative of one or more of presence, position, motion, or features of one or more input objects;
- wherein a sum of the first and second phasors is constrained to be within a maximum magnitude;
- wherein the instantaneous phases of the sensing signals is adjusted such that, while driving the sensor electrodes with the sensing signals, the first phasor rotates clockwise while the second phasor rotates counterclockwise;
- wherein the instantaneous phases of the sensing signals is adjusted such that, while driving the sensor electrodes with the sensing signals, the first and second phasors each reverse rotation upon a sum of the first and second phasors reaching the maximum magnitude at a point where the first and second phasors have the same phase;
- wherein prior to the first and second phasors reversing rotation, the clockwise rotation of the first phasor and the counterclockwise rotation of the second phasor causes the sum of the first and second phasors to increase; and
- wherein after the first and second phasors reverse rotation, the first phasor rotates counterclockwise and the second phasor rotates clockwise, and the counterclockwise rotation of the first phasor and the clockwise rotation of the second phasor causes the sum of the first and second phasors to decrease.

15. The method according to claim 14, wherein respective sensing signals are generated by respective transmitter circuits configured to generate respective waveforms.

16. The method according to claim 14, wherein driving the sensor electrodes of the plurality of sensor electrodes with sensing signals corresponding to the plurality of frequencies includes driving at least two respective sensor electrodes with the same frequency and driving at least two respective sensor electrodes with different frequencies.

17. The method according to claim 14, wherein the instantaneous phase adjustment limits a sum of all voltages of the sensing signals to be less than or equal to a peak voltage.

* * * * *